(12) United States Patent
Kuroda

(10) Patent No.: US 8,453,046 B2
(45) Date of Patent: May 28, 2013

(54) DOCUMENT PROCESSING APPARATUS AND METHOD

(75) Inventor: Ken Kuroda, Kawasaki (JP)

(73) Assignee: Canon Kabushiki Kaisha (JP)

(*) Notice: Subject to any disclaimer, the term of this patent is extended or adjusted under 35 U.S.C. 154(b) by 1496 days.

(21) Appl. No.: 11/550,022

(22) Filed: Oct. 17, 2006

(65) Prior Publication Data
US 2007/0084370 A1    Apr. 19, 2007

(30) Foreign Application Priority Data
Oct. 17, 2005 (JP) ................................. 2005-302161

(51) Int. Cl.
G06F 17/00 (2006.01)

(52) U.S. Cl.
USPC .......................................... 715/209; 715/203

(58) Field of Classification Search
USPC .................................. 715/209, 203
See application file for complete search history.

(56) References Cited

U.S. PATENT DOCUMENTS

| | | | | |
|---|---|---|---|---|
| 6,134,568 | A * | 10/2000 | Tonkin | 715/209 |
| 6,393,441 | B1 * | 5/2002 | Kanerva et al. | 715/208 |
| 7,359,517 | B1 * | 4/2008 | Rowe | 380/284 |
| 7,657,832 | B1 * | 2/2010 | Lin | 715/234 |
| 8,223,356 | B2 * | 7/2012 | Kadowaki | 358/1.15 |
| 2003/0041110 | A1 * | 2/2003 | Wenocur et al. | 709/206 |
| 2004/0267595 | A1 * | 12/2004 | Woodings et al. | 705/9 |
| 2005/0122540 | A1 * | 6/2005 | Kadowaki | 358/1.15 |
| 2006/0031261 | A1 * | 2/2006 | Behringer | 707/200 |
| 2007/0079227 | A1 * | 4/2007 | Singh et al. | 715/500 |
| 2007/0150494 | A1 * | 6/2007 | Harrington et al. | 707/100 |
| 2007/0150808 | A1 * | 6/2007 | Harrington | 715/523 |
| 2009/0019064 | A1 * | 1/2009 | Takafuji | 707/100 |

FOREIGN PATENT DOCUMENTS

| | | |
|---|---|---|
| JP | 6-149844 A | 5/1994 |
| JP | 07-168849 A | 7/1995 |
| JP | 2005-259015 A | 9/2005 |

OTHER PUBLICATIONS

Notification of First Office Action, dated Aug. 29, 2008, issued in corresponding CN application No. 2006101405778.
Office Action issued in corresponding Japanese Patent Application 2005-302161 dated Nov. 7, 2011.
"Ricoh Technical Report No. 30" Office System R&D Center, Research and Development Group, Dec. 2004, pp. 128-135, Japan. English abstract provided.
Office Action issued in corresponding Japanese Patent Application No. 2005-302161 dated Feb. 18, 2011.

* cited by examiner

*Primary Examiner* — Doug Hutton, Jr.
*Assistant Examiner* — Soumya Dasgupta
(74) *Attorney, Agent, or Firm* — Rossi, Kimms & McDowell LLP

(57) ABSTRACT

A document processing apparatus for generating a binder document by binding a plurality of original documents makes access to a storage unit for storing the binder attribute information of the binder types of a plurality of kinds of binder documents, and acquires the binder attribute information corresponding to the binder type of the binder document to be generated. Also, the document processing apparatus acquires the document type of each of the plurality of original documents selected to be bound into the binder document to be generated. The binder document is generated employing the plurality of selected original documents, based on the document type acquired regarding the plurality of selected original documents and the binder attribute information.

15 Claims, 13 Drawing Sheets

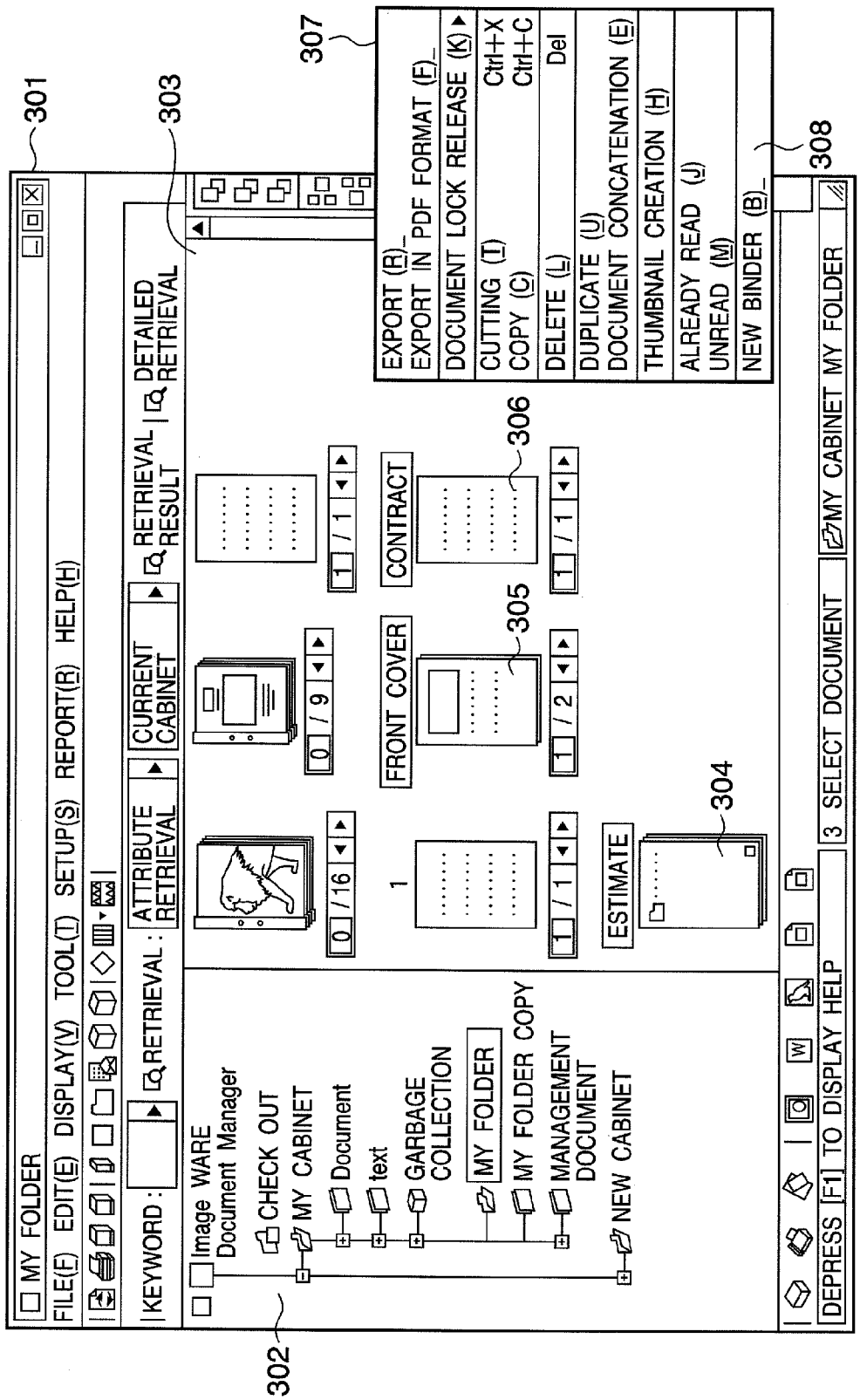

FIG. 6B

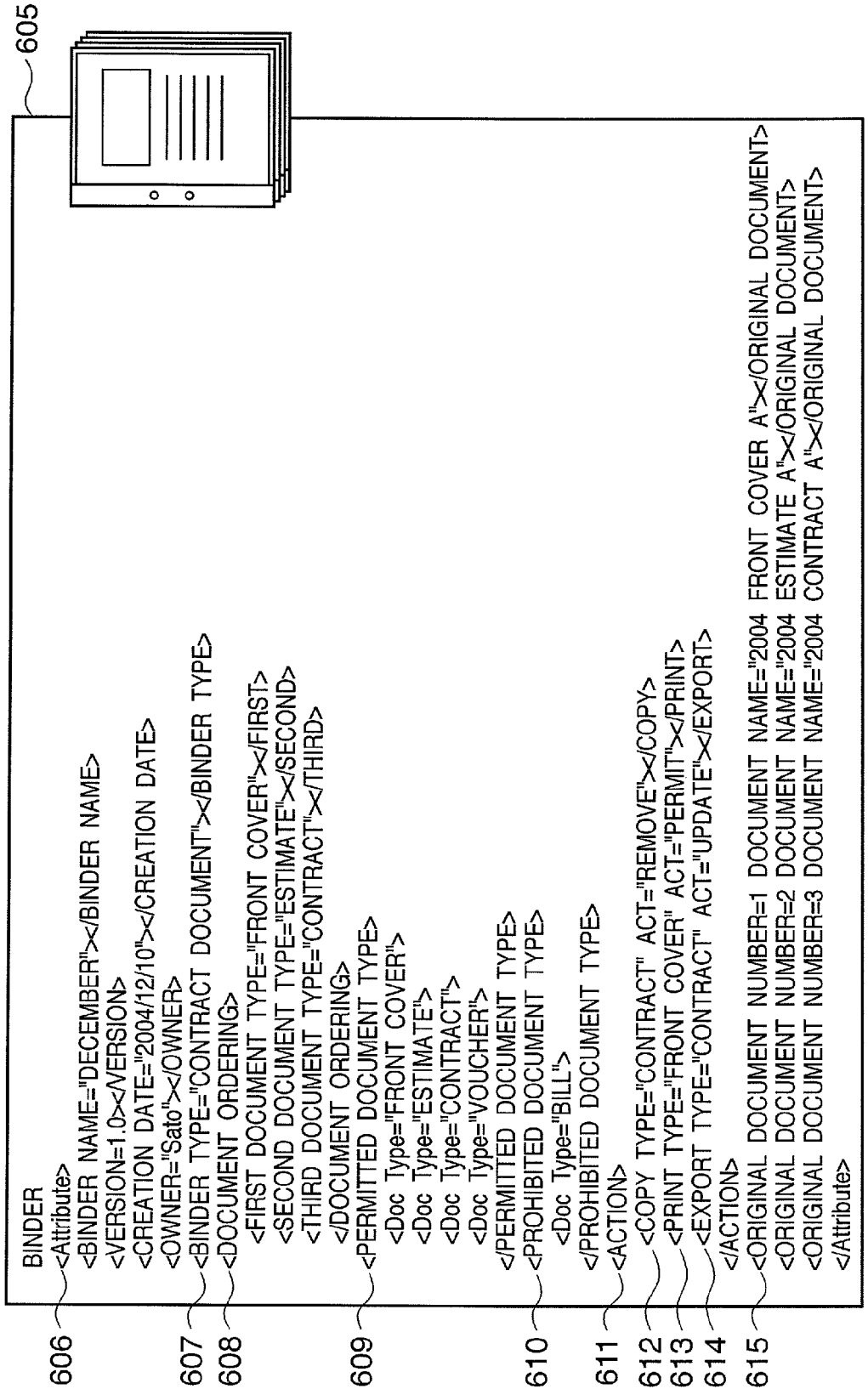

```
BINDER
  <Attribute>
    <BINDER NAME="DECEMBER"></BINDER NAME>
    <VERSION=1.0></VERSION>
    <CREATION DATE="2004/12/10"></CREATION DATE>
    <OWNER="Sato"></OWNER>
    <BINDER TYPE="CONTRACT DOCUMENT"></BINDER TYPE>
    <DOCUMENT ORDERING>
      <FIRST DOCUMENT TYPE="FRONT COVER"></FIRST>
      <SECOND DOCUMENT TYPE="ESTIMATE"></SECOND>
      <THIRD DOCUMENT TYPE="CONTRACT"></THIRD>
    </DOCUMENT ORDERING>
    <PERMITTED DOCUMENT TYPE>
      <Doc Type="FRONT COVER">
      <Doc Type="ESTIMATE">
      <Doc Type="CONTRACT">
      <Doc Type="VOUCHER">
    </PERMITTED DOCUMENT TYPE>
    <PROHIBITED DOCUMENT TYPE>
      <Doc Type="BILL">
    </PROHIBITED DOCUMENT TYPE>
    <ACTION>
      <COPY TYPE="CONTRACT" ACT="REMOVE"></COPY>
      <PRINT TYPE="FRONT COVER" ACT="PERMIT"></PRINT>
      <EXPORT TYPE="CONTRACT" ACT="UPDATE"></EXPORT>
    </ACTION>
    <ORIGINAL DOCUMENT NUMBER=1 DOCUMENT NAME="2004 FRONT COVER A"></ORIGINAL DOCUMENT>
    <ORIGINAL DOCUMENT NUMBER=2 DOCUMENT NAME="2004 ESTIMATE A"></ORIGINAL DOCUMENT>
    <ORIGINAL DOCUMENT NUMBER=3 DOCUMENT NAME="2004 CONTRACT A"></ORIGINAL DOCUMENT>
  </Attribute>
```

DOCUMENT PROCESSING APPARATUS AND METHOD

BACKGROUND OF THE INVENTION

1. Field of the Invention

The present invention relates to a document processing apparatus and method suitable for document management for binding and managing a plurality of documents into one document.

2. Description of the Related Art

A document management apparatus that can bind a plurality of documents (hereinafter original documents) to create one document (hereinafter a binder document) or add a new document to such a binder document has been proposed. In creating or updating this binder document, the ordering of original documents within the new binder document is generally made according to the order of the date or name of the document. Also, it has been proposed that the user specifies the ordering of documents in performing an operation of binding the documents. Also, a character written at a specific position of the document such as the page number may be recognized, employing a character recognition technique, and the documents may be bound in its order (refer to Japanese Patent Laid-Open No. 07-168849).

On the other hand, there is a demand for restricting copying or prohibiting printing depending on the original document. Thus, whether or not a process for the document is performed is determined by setting the access right for each document. In this case, there is a restriction on each binder document consisting of a plurality of documents (in a unit of binder document), because the binder document is treated as one document.

However, with the prior art described above, in binding a plurality of original documents to create one binder document or adding a new original document to the binder document, the user was required to make an operation to put the ordering of the original documents into the desired ordering, which took a lot of trouble. At this time, the user might make an incorrect operation such as a mistake in specifying the ordering, possibly impeding the later document operation or application. In a constitution as disclosed in Japanese Patent Laid-Open No. 07-168849, the ordering is automatically decided, but it is required to make aware of the position of original document in the binder document in creating each original document, because of assigning the page number. Also, in a constitution as disclosed in Japanese Patent Laid-Open No. 07-168849, it is not possible to meet a request for binding one original document at the top in a certain binder, and at the end of another binder.

Also, even if the copy or print of the document was restricted by setting the access right, it was not possible to make the access restriction on each of the original documents making up the binder document, because the binder document itself is one document. And since setting the access right is a function/management method set up according to the user registered in a system for managing the document, it greatly depends on the system to be operated. For example, every time the document was registered in another document management system, it was necessary to set the access right according to that particular system, which was not an efficient process and had poor universality.

Also, there is a case where the original document may be left behind and added to the binder document. In this case, when the user edits and updates the original document, an update operation for the binder document is needed. If this update operation is neglected, the document information added to the binder document is not updated, making it impossible to manage the latest information.

SUMMARY OF THE INVENTION

This invention has been achieved in the light of the above-mentioned problems, and it is an object of the invention to improve the operability regarding the binder document.

According to one aspect of the present invention, there is provided a document processing apparatus for generating a binder document by binding a plurality of original documents, comprising: a first acquisition unit adapted to acquire the binder attribute information corresponding to a binder type of the binder document to be generated; a second acquisition unit adapted to acquire the document type of each of the plurality of original documents selected to be bound into the binder document to be generated; and a generation unit adapted to generate the binder document from the plurality of selected original documents based on the document type acquired by the second acquisition unit and the binder attribute information acquired by the first acquisition unit.

Also, according to another aspect of the present invention, there is provided a document processing apparatus for performing a designated process for a binder document generated by binding a plurality of original documents, comprising: an input unit adapted to input a designation of the binder document and a designation of the process; a first acquisition unit adapted to acquire the document type of each of the plurality of binder documents bound into the binder document designated by the input unit; a second acquisition unit adapted to acquire the control information defining a control regarding a combination of the process designated by the input unit and each document type acquired by the first acquisition unit from the attribute information of the designated binder document; and an execution unit adapted to execute the designated process in accordance with the control information acquired by the second acquisition unit.

Furthermore, according to another aspect of the present invention, there is provided a document processing method for generating a binder document by binding a plurality of original documents, comprising: a first acquisition step of acquiring the binder attribute information corresponding to a binder type of a binder document to be generated; a second acquisition step of acquiring the document type of each of the plurality of original documents selected to be bound into the binder document to be generated; and a generation step of generating the binder document from the plurality of selected original documents based on the document type acquired at the second acquisition step and the binder attribute information acquired at the first acquisition step.

Furthermore, according to another aspect of the present invention, there is provided a document processing method for performing a designated process for a binder document generated by binding a plurality of original documents, comprising: an input step of inputting a designation of the binder document and a designation of the process; a first acquisition step of acquiring the document type of each of the plurality of original documents bound into the binder document designated at the input step; a second acquisition step of acquiring the control information defining a control regarding a combination of the process designated at the input step and each document type acquired at the first acquisition step from the attribute information of the designated binder document; and an execution step of executing the designated process in accordance with the control information acquired at the second acquisition step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an operation screen example when creating the binder document;

DESCRIPTION OF THE EMBODIMENTS

Preferred embodiments of the present invention will now be described in detail in accordance with the accompanying drawings In the following embodiment, an electronic document management system that can set up the rules of binding a plurality of documents and bind the documents in accordance with the set rules will be described below. Also, this electronic document management system can set up a procedure for performing the document copy or print for the bound documents and the restrictions, and process the documents in accordance with the settings.

[Configuration of Document Management System]

Figure 1:
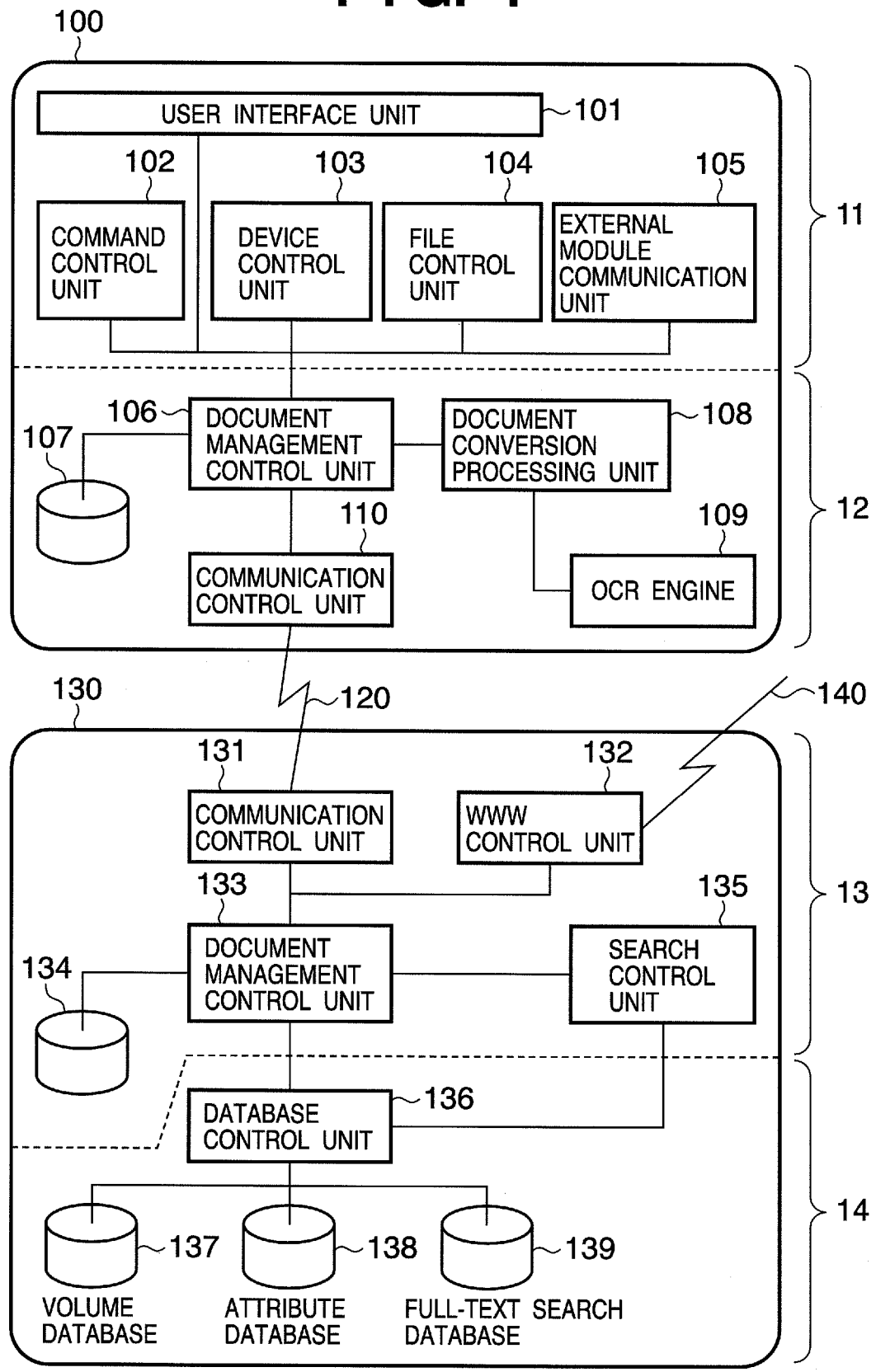
FIG. 1 is a block diagram showing the configuration of a document management system according to an embodiment of the present invention.

FIG. 1 is a block diagram showing the system configuration and functional configuration of a document management system according to an embodiment of the invention. The document management system of this embodiment is a client server type application operating on an OS of a personal computer. The document management system reads a document from a device such as a scanner, or a file on the OS, and allows the document to be managed among a plurality of users. Also, all the documents to be stored are automatically converted into an XML format, and treated. Further, the document data of a sever can be treated by making access to the server, employing a WEB browser. In FIG. 1, reference numeral 100 designates a client system and reference numeral 130 designates a server system, in which the client system 100 and the server system 130 are connected via a network 120 (e.g., local area network). The client system 100 and the server system 130 can be realized by a general-purpose computer apparatus (e.g., personal computer). In this case, each function as shown in FIG. 1 is implemented in cooperation of software and hardware by executing a control program stored in a memory with each CPU.

In the following, the client system 100 is called a client 100 and the server system 130 is called a server 130.

<Document Input/Output Processing Unit>

First of all, a processing unit (hereinafter referred to as a document input/output processing unit 11) for performing the input/output or operation of document in the client 100 will be described below.

A user interface unit 101 accepts various operation instructions from the user. The user makes the registration of the document to the server 130, the acquisition of the document from the server 130, or the retrieval of the document within the server 130 via the user interface unit 101.

The information inputted by manipulating the user interface unit 101 is analyzed by a command control unit 102, and appropriately processed. Also, the command control unit 102 creates a command for making the communication with the server 130, as needed. Also, the device such as a scanner is controlled by a device control unit 103. The device control unit 103 sucks the document data from the device, or receives the data sent from the device. A file control unit 104 performs an input process for importing the document file saved on the OS of the server 130. Also, the file control unit 104 performs an output process for exporting a file to be managed on the server 130 to the OS of the server 130. An external module communication unit 105 makes the communication with an external application, and performs a process for passing the document acquired from the server 130 to the external application, or receiving the document from the external application. For example, the external module communication unit 105 performs a process for passing the document managed by the server 130 to a mailer adaptable to an MAPI (Messaging Application Program Interface).

<Client System Internal Processing Unit>

A client system internal processing unit 12 within the client 100 will be described below.

A document management control unit 106 forms the core of the client 100. In this embodiment, the document management control unit 106 performs a management control process in accordance with a file or a user command passed from the document input/output processing unit 11. An internal data storage unit 107 saves the temporary data, and temporarily saves the data created in the course of the image processing, or data created in the course of the communication with the server 130, for example. The document conversion processing unit 108 converts the file of not XML format into the XML format. In this embodiment, all the data is saved in the XML format.

An OCR engine 109 performs an OCR process in accordance with an instruction of the document conversion processing unit 108 to extract the text information from the image data, if the file is image data. The document conversion processing unit 108 performs the conversion into the XML format, employing the text information obtained from the OCR engine 109. A communication control unit 110 controls the communication with the server 130. The communication control unit 110 of this embodiment performs only the control specific to the process of the server 130, but the control of the communication itself with a TCP/IP or the like is made by the unit prepared for the OS.

<Server System Internal Processing Unit>

A server system internal processing unit 13 within the server 130 will be described below.

A communication control unit 131 controls the communication with the communication control unit 110 of the client system 100. The communication control unit 131 can make the communications with the communication control units for a number of clients at the same time. A WWW control unit 132 controls access to the server 130 from a WEB browser via the Internet 140. The WWW control unit 132 fundamentally performs the same process as the communication control unit 131, but employs an HTTP as the communication protocol.

A document management control unit 133 controls the process on the side of the server 130 in accordance with an instruction from the client 100 or WEB. An internal data storage unit 134 saves the temporary data, and temporarily saves the data created in the course of the communication with the client 100, or the document converted in accordance with the document conversion rules, for example. A search control unit 135 performs a process for search requested from the client 100, or a process for creating the search index for the registered document. The search for a keyword within the document in this embodiment is performed by the search control unit 135.

<Database Processing Unit>

A database processing unit 14 of the server 130 will be described below.

A database control unit 136 performs a process for creating the data to be stored in the database, and storing or registering the corresponding document in a volume database 137, an attribute database 138 and a full-text search database 139. Also, the database control unit 136 performs a process for taking out the data from the respective database in accordance with a request from the client 100 and creating the document to be passed to the client 100.

The entity of the document is stored in the volume database 137. The volume database 137 may be conceptual, but in entity a file system of the OS. The attribute database 138 stores the information regarding the attributes such as the name, creation date and comment of document. Also, the attribute database 138 stores the management information data such as information of the user who employs the document management system, an access control table for the keyword, and the document conversion rules according to the access right. The full-text search database 139 registers the index information made by extracting the text data from the registered document. If the full-text search is instructed from the client 100, the server 130 conducts a document search, employing the full-text search database 139.

[Operation of Document Management System]

Figure 2A:
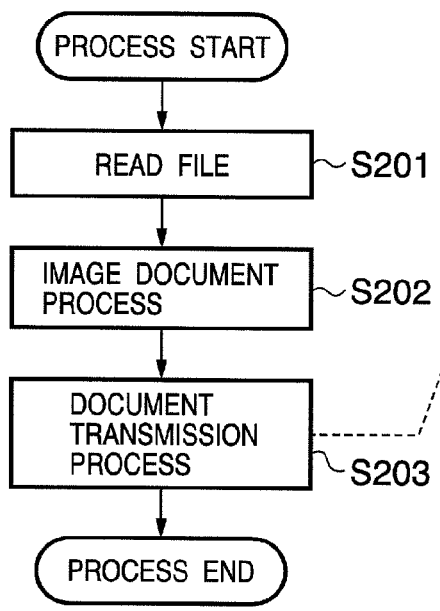
FIGS. 2A and 2B are flowcharts showing a basic operation of the document management system according to the embodiment.
Figure 2B:
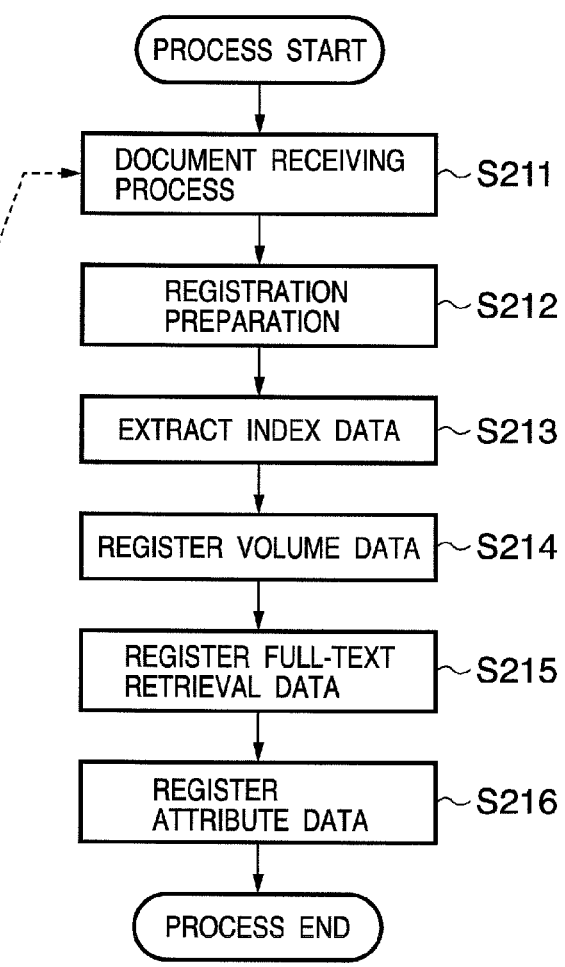

FIGS. 2A and 2B are flowcharts showing a basic operation of the document management system according to this embodiment. FIG. 2A shows the operation on the client side, and FIG. 2B shows the operation on the server side.

<Client Document Registration Process>

First of all, a document registration process on the side of the client 100 will be described below.

At step S201, the document management control unit 106 performs a process for reading the file into a document management application via the document input/output processing unit 11. In this process, the document management control unit 106 employs any one of the device control unit 103, the file control unit 104 and the external module communication unit 105. And the document management control unit 106 reads the file existing on the OS, the image from the scanner, or the document from the external application into the document management system.

At step S202, the document conversion processing unit 108 performs a document conversion process for the image or document read at step S201. This process involves creating a thumbnail corresponding to the document data, or converting the document into a document retention format for the document management system. At this time, the file may be temporarily saved in a temporary folder in the internal data storage unit 107. In this embodiment, since all the retained documents are converted into the XML format, the text data is extracted by the OCR engine 109, when the document is the image document. At step S203, the thumbnail and document data are transmitted to the server 130. In this embodiment, a TCP/IP is used as the communication protocol. A basic process regarding the TCP/IP is performed by the OS. The above is the document registration process in the client 100.

<Server Document Registration Process>

A document registration process in the server 130 will be described below. The following process from step S211 to step S216 is performed by the document management control unit 133.

At step S211, the document management control unit 133 receives the data transmitted from the client 100 at step S203 via the communication control unit 131. In this process, a basic process regarding the TCP/IP is performed by the OS, like the client 100.

At step S212, the document management control unit 133 makes preparations (memory allocation for processing work, etc.) for a registration process for the received document. At step S213, the document management control unit 133 extracts the index data used for search from the document received at step S211. At step S214, the document management control unit 133 stores the document data received from the client 100 in the volume database 137, employing the database control unit 136. The data stored in the volume database 137 is the received document data itself or the thumbnail data.

At step S215, the document management control unit 133 registers the index data for search extracted from the document data at step S213 in the full-text search database 139. And at step S216, the attribute data of the document, the ID of the document data registered in the volume database 137 and the ID of the index data for search registered in the full-text search database 139 are registered in the attribute database 138. Through the above process, the data registered in the attribute database, the volume database, and the search database are associated. The above is the document registration process in the server 130.

[Creation of Binder Document]

An operation method for creating a binder document from a plurality of original documents registered in the document management system will be described below.

FIG. 3 is a view showing in detail the user interface unit 101 in the document management system according to this embodiment. The user starts a document management application, and makes access to the document or various kinds of information within the document management system on a main screen 301. In a tree view display area 302, a document management structure within the document management system is conceptually illustrated in a hierarchy. A cabinet ("my cabinet" in FIG. 3) exists as the largest management unit, and a plurality of folders exist hierarchically in the cabinet. The document is stored in this folder. The document stored within each folder is displayed in a document display area 303. In the document display area 303, the document can be displayed as the thumbnail image or list, and the user can change the display format to his liking. Each document is managed by the database processing unit 14. That is, the document management control unit 106 acquires the thumbnail of the document data existing within the designated folder from the volume database 137 and displays it in the document display area 303.

A case of creating the binder document from the original documents of an estimate document 304, a front cover document 305, and a contract document 306 among the documents as shown in FIG. 3 will be described below. In this case, the user firstly selects each original document (the estimate document 304, the front cover document 305, and the contract document 306) from the document display area 303. A new binder menu 308 is specified from a file menu or from a sub-menu dialog 307, which is displayed by right-clicking the mouse.

Figure 4:
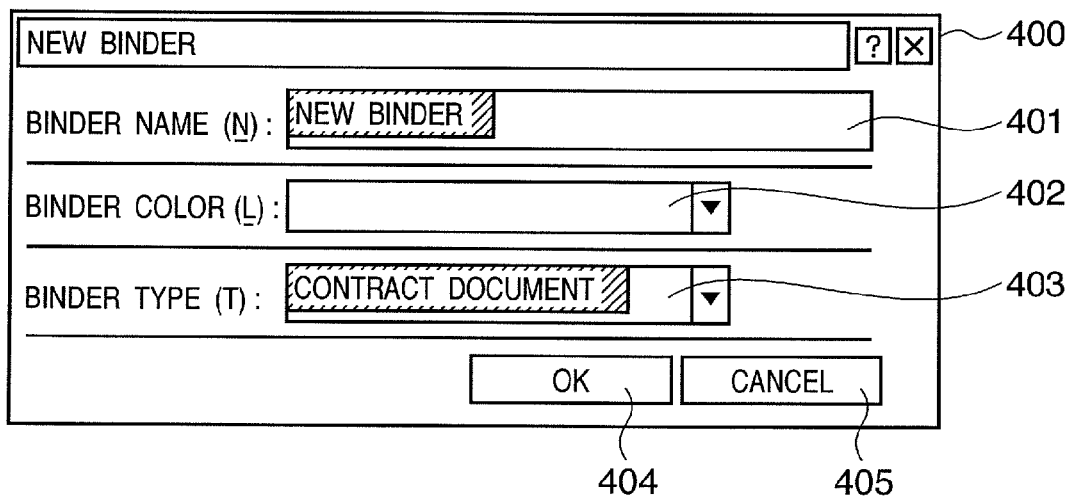
FIG. 4 is a view showing a setting screen example when creating the binder document.

A new binder creation dialog 400 is displayed in accordance with a designation of the new binder menu 308 by the above operation, as shown in FIG. 4. In the new binder creation dialog 400, a desired document name can be designated as the document name of a newly created binder document, employing an input area 401. In an input area 402, the binder color can be designated from preset eight colors. The designated binder color is used as the background color when displaying the thumbnail in the document display area 303. The thumbnail display is effective to visually discern the document in the document display area 303.

In an input area 403, the user can designate the binder type. By designating the binder type, the original documents can be automatically bound in the order of document types designated beforehand for each binder type. As a result, the user does not need to designate the order of original documents at every time of operation. The binder type will be described later in detail.

By depressing an OK button 404, the set entries in the binder creation dialog are settled. Also, the set entries are invalidated by manipulating a cancel button 405. If the OK button 404 is depressed, the binder document is newly created by binding the original documents in the order set for the designated binder type.

Figure 5:
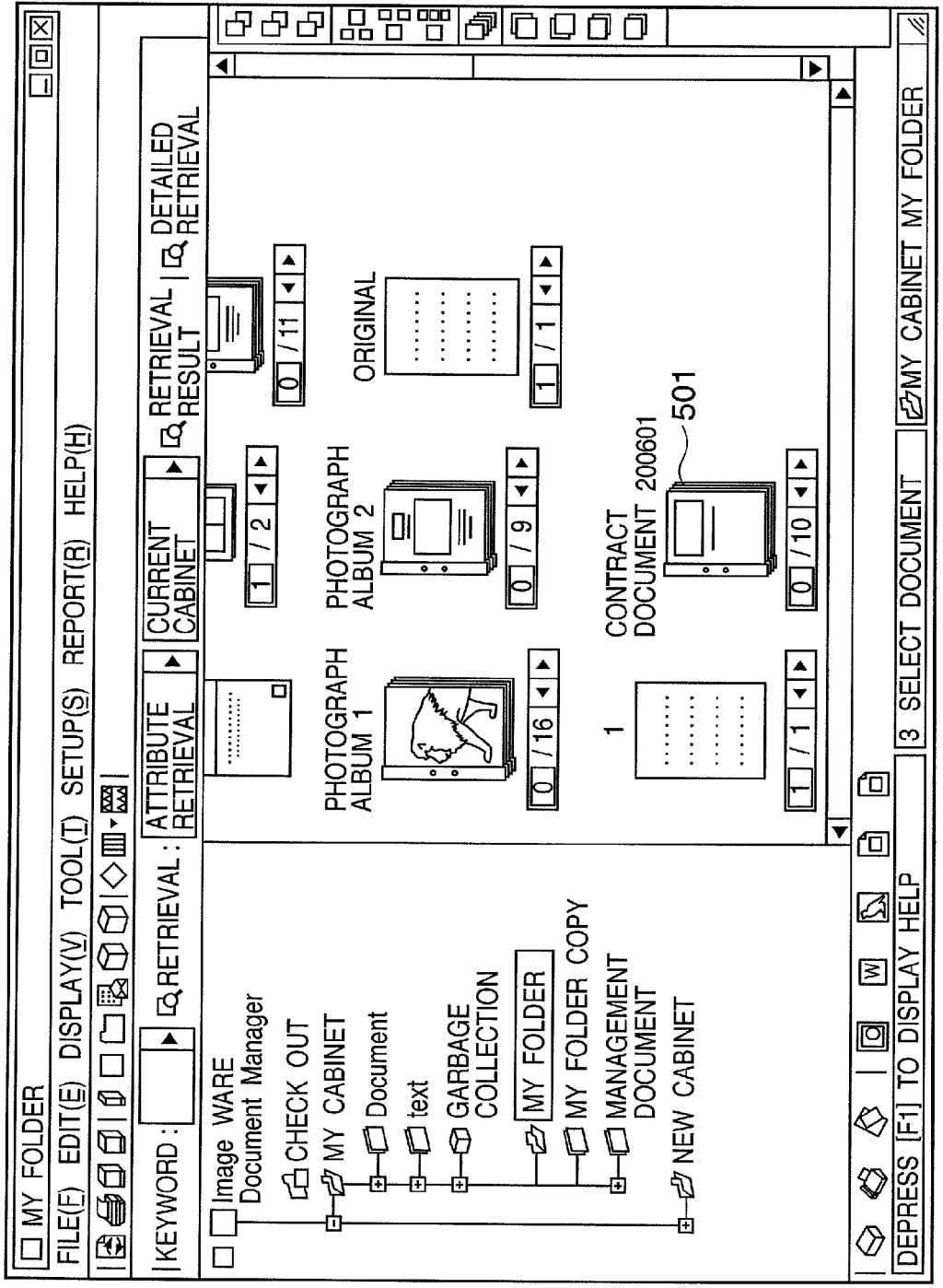
FIG. 5 is a view showing an operation screen example after creating the binder document.

FIG. 5 is a view showing a displayed state of the created binder document. In FIG. 5, the original documents (the estimate document 304, the front cover document 305, and the contract document 306) are deleted, and a new binder document 501 is displayed. However, it does not matter that the original documents may be left behind to create the new binder document.

Figure 6:
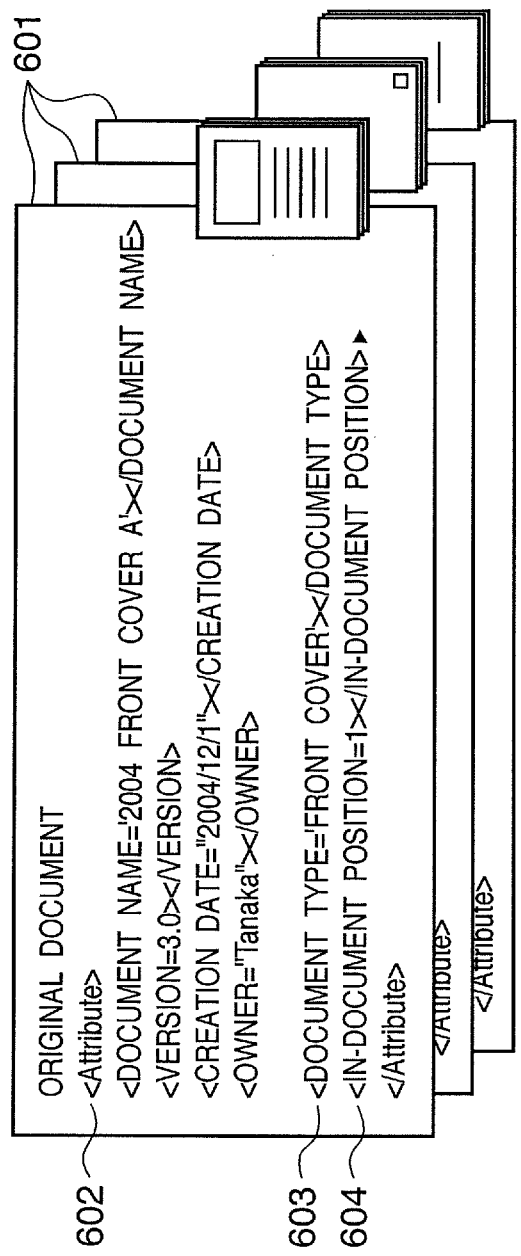
FIGS. 6A and 6B are views for explaining the examples of document data structure.

Thus, the creation operation method for the binder document according to this embodiment has been described above. Referring now to FIGS. 6A and 6B, the characteristic data structures of the original document and the binder document according to this embodiment will be described below.

<Data Structures of Original Document and Binder Document>

In FIG. 6A, reference numeral 601 designates the attribute data of three original documents, in which one binder document (FIG. 6B) is created from these three original documents. For each document, the attribute information of document is described in a structured language such as an XML. The document management system can perform various kinds of process, while reading the attribute information described within the document, or can separately manage the attribute information in the database of the document management system by reading the attribute information of the document at the time of registering, changing or editing the document.

Reference numeral 602 designates a tag indicating the beginning of the attribute information of the original document, in which this tag is paired with another tag with slash at the top of the tag name. A plurality of tags may exist in a hierarchy. The attribute information of the document consists of the document name, the document version number, the document creation date, the owner representing the user name who creates the document, and additional information.

Reference numerals 603 and 604 designate a "document type" tag and a "document inner position" tag according to this embodiment. The "document type" tag 603 defines the document type attribute, indicating that the kind of document is "front cover" or "estimate", for example. Also, the "document inner position" tag 604 defines the document inner position attribute indicating at what number the document is bound into the binder document in the ordering of the original documents. When creating the binder document, the document ordering is automatically decided in accordance with the document type attribute and the document inner position attribute. Or for the conditional judgment for binding into the binder document, the document type attribute and the document inner position attribute are used. Also, when the binder type is designated in the input area 403, firstly, the predetermined order of document type is acquired based on the designated binder type. Secondly, the order of the original documents is determined based on the document type attribute of the original document and the acquired predetermined order. Thirdly, if there are the original documents having same document type attribute, the order of the original documents having the same document type attribute is determined based on the document inner position attribute.

The document type attribute and the document inner position attribute are explicitly indicated by the user when the document is newly created, or also indicated by the user when the document is imported. However, the document type attribute and the document inner position attribute may be automatically set up when the document is newly created or imported in the specific folder within the document management system, for example, or automatically set up after the document is discriminated by character recognition.

Referring to FIG. 6B, the attribute information of the binder document will be described below. The data structure of the binder document is equivalent to the data structure of the original document, and additionally includes the tags characteristic to the binder document. Reference numeral 606 designates a tag indicating the beginning of the attribute information of the binder document, in which the tag is paired with another tag with slash at the top of the tag name. A binder type tag 607 defines the binder document type attribute. A plurality of binder document type attributes are registered beforehand in the system. When the binder document is created, the user selects and designates a desired one from them. A method for registering the binder document type attribute in the system will be described later. Also, a method for selecting and designating the binder type has been already described in connection with FIG. 4 (the input area 403).

A document ordering tag 608 defines in what order the original documents are bound. In this embodiment, if the binder type is designated in the input area 403, the document type ordering is uniquely specified. Therefore, this attribute information is decided in accordance with the binder type. However, in another embodiment, the original document ordering may be changed based on a user instruction without depending on the designated binder type attribute.

A permitted document type tag 609 defines the type of original document that can be bound into the binder document. If the original document is of the type defined by the permitted document type tag 609, the document can be bound into this binder document. However, if the document is of the type in which the ordering is not defined by the document ordering tag 608 described above, the system may arrange its original document in predetermined position (e.g. last position), or accept an instruction of where to arrange the original document from the user.

On the contrary, a prohibited document type tag 610 defines the type of the original document that can not be bound into the binder document. The original document of the concerned document type is not bound into the binder document, in which a warning message is displayed to the user, or an operation log is maintained, as needed.

As described above, a series of document attribute information regarding the document ordering are defined as the tags. Further, in this embodiment, when a copy, print or export operation is performed on the created binder document, an optimal process (hereinafter an action) may be performed for each original document in accordance with the type attribute of the original document. An action tag 611 defines what process is performed for each action.

A copy tag 612 within the action tag 611 defines the process for the document of the designated type at the time of copy operation. When the original document type is "contract" according to the attribute information indicated by the copy tag 612 of FIG. 6B, the copy tag defines "Remove", namely, removing the original document from the binder document at the copy time. That is, if this binder document is copied, the copied binder document does not contain the original document of "contract" type.

A print tag 613 within the action tag 611 defines the process for the document of the designated type at the time of print operation. For the original document in which the original document type is "front cover" according to the attribute information indicated by the print tag 613 of FIG. 6B, the print process is enabled, but the printing of the original document of other document type is prohibited. Thereby, the original document with the classified information described, for example, is prevented from being printed carelessly.

An export tag 614 within the action tag 611 defines the process for the document of the designated type at the time of export operation. According to the attribute information indicated by the export tag 614 of FIG. 6B, the contents of the original document in which the original document type is "contract" are updated at the export time. Though the original document can be left behind in creating the binder document, as previously described, the user may treat the left original document as the original document, and subsequently make the update/edit operation. In this case, the contents of the original document may be different from the contents of the original document bound into the binder document. Therefore, the contents of the original document are replaced with the latest contents of the original document at the time of exporting the document in this case. Thereby, it is unnecessary that the user confirms the update situation of the original document individually.

An original document tag 615 defines the information of the original document actually bound into the binder document. It is possible to select whether the original document to be left behind or deleted at will, as previously described. The original document tag 615 as shown in FIG. 6B is involved in a case where the original document is deleted, in which only the document name of the original document is defined as the attribute information. When the original document is left behind, the cabinet and folder path where the original document exists are defined.

<Binder Document Attribute Setting and Interface>

Referring to FIGS. 7 to 10, a method for registering the attribute information of the binder document (also called a binder attribute) such as binder document type attribute as described in connection with FIG. 6B in the system will be described below.

Figure 7:
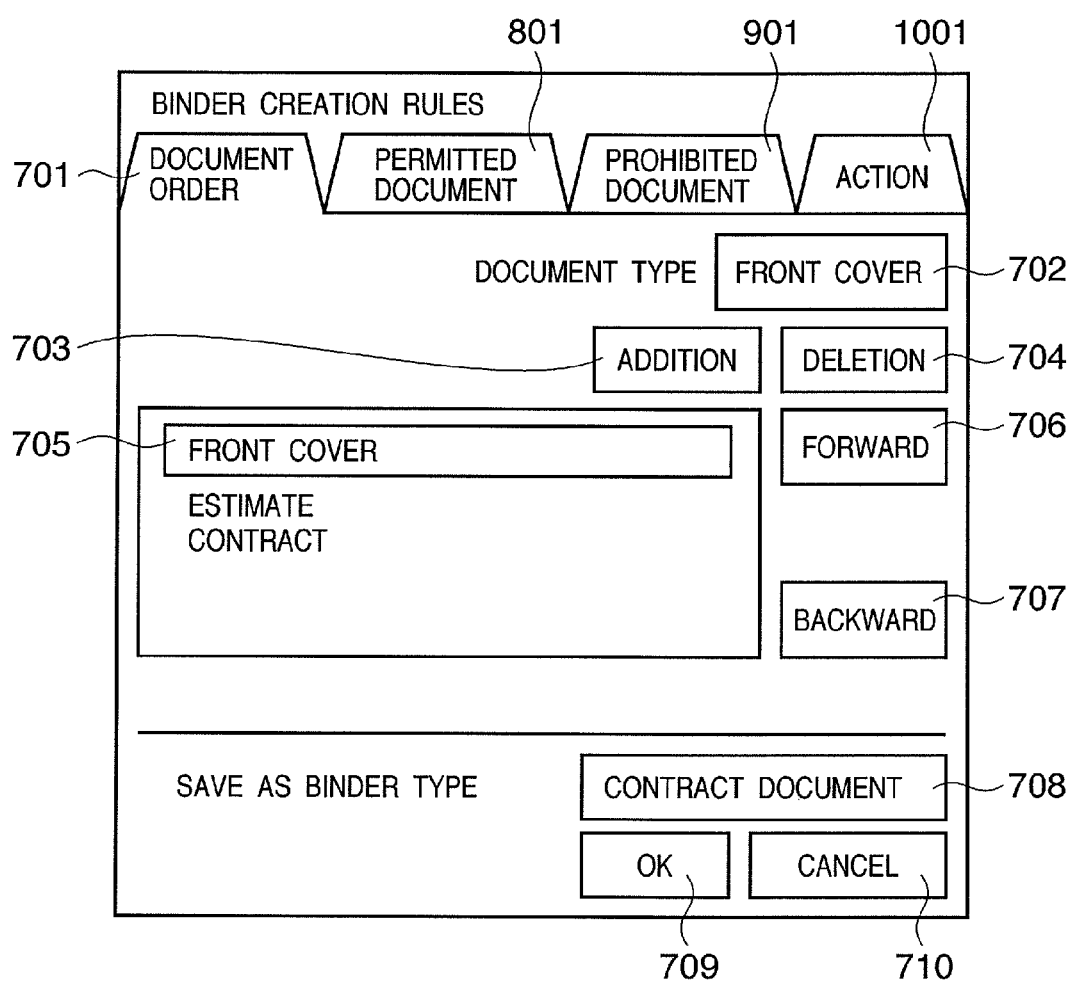
FIG. 7 is a view showing a setting screen example of binder creation rules regarding the document ordering.

First of all, the user starts a program application of the document management system, and designates a binder creation rule menu (not shown) from a setup menu of the main screen 301 as shown in FIG. 3. Then, a setup dialog as shown in FIG. 7 is displayed. The setup dialog has four tabs of "document order", "permitted document", "prohibited document" and "action", for each of which the detail setup can be made. The input of document type into each input area on the setup dialog is made by keying in the character string on a keypad for keying in the character string which is displayed separately. Of course, if a keyboard is connected, the document type may be typed on the keyboard.

(1) Setting the Document Order

If a setting tag 701 for the document order is selected, a screen as shown in FIG. 7 appears. An input area 702 is the area for inputting the document type of the original document bound into the binder document. If an addition button 703 is depressed (clicked) after the document type of the original document is inputted into the input area 702, the document type inputted into the input area 702 is added to a document ordering display area 705. Conversely, when the document type designated in the document ordering display area 705 is deleted, the document type to be deleted within the document ordering display area 705 is selected, and a deletion button 704 is depressed. The ordering of display from top to bottom in the document ordering display area 705 is directly the ordering in which the original documents are bound into the binder document. When the ordering in the document ordering display area 705 is changed, the document type to change the order is selected in the document ordering display area 705, and a forward button 706 or a backward button 707 is depressed. The orders of the document types displayed in the document ordering display area 705 are interchanged in accordance with the depressed button. A binder document type name is inputted into an input area 708.

In an example as shown in FIG. 7, for the binder document type of "contract document", the binder document is created by binding the original documents in the order in which the document type is "front cover", "estimate" and "contract". If all the settings are ended, an OK button 709 is depressed, so that the setup information is recorded in the system. Thus, the information corresponding to the document ordering tag 608 regarding the binder type is set up. If the same binder document type as the type inputted in the input area 708 is already set up in the system, a warning dialog is displayed to prompt the user to select whether the settings are directly overwritten and recorded, or the settings are made again. If the binder document type is not set up in the system, a plurality of binder document types can be set up and registered in the system in a range where the number of binder document types does not exceed the upper limit for the system. The setting can be canceled by depressing a cancel button 710.

(2) Setting the Permitted Document Type

Figure 8:
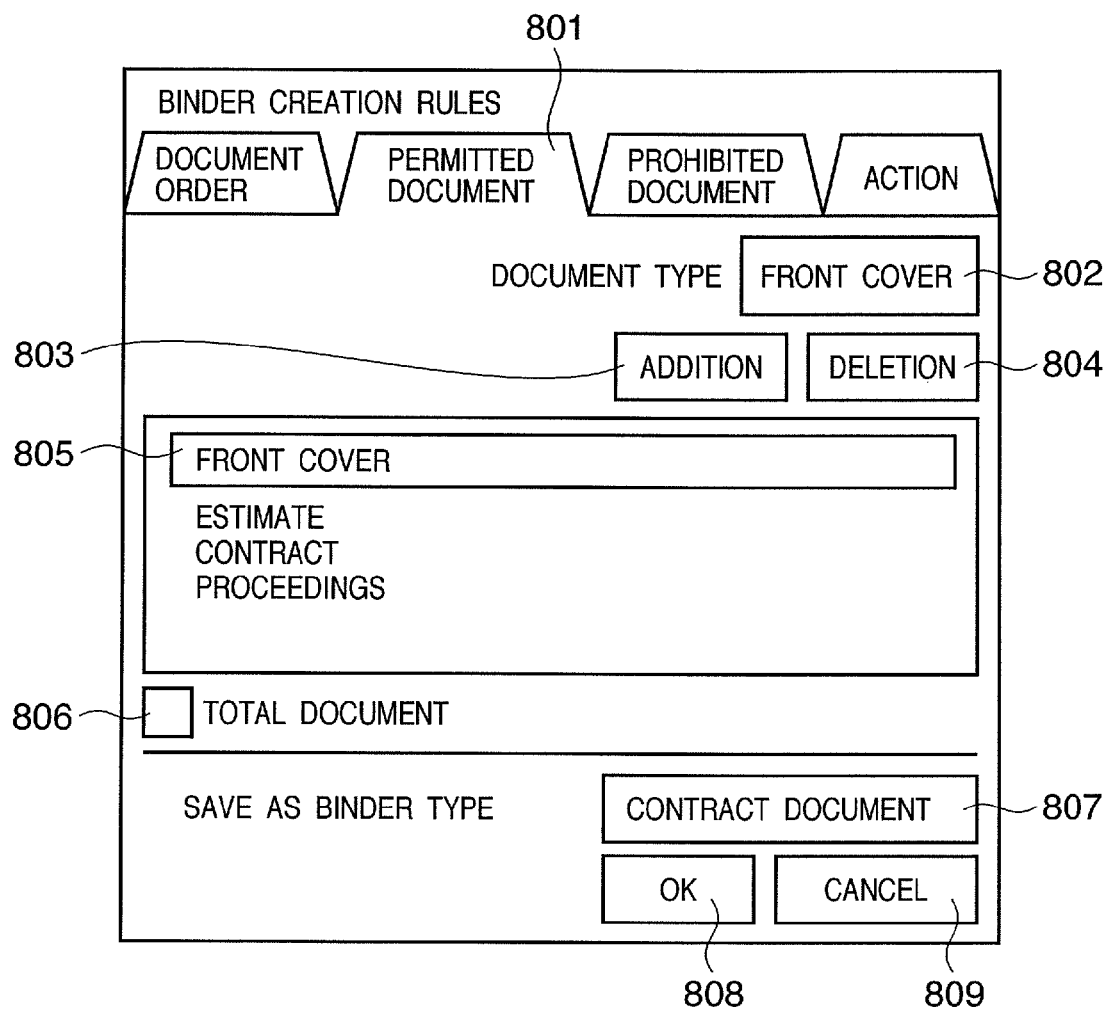
FIG. 8 is a view showing a setting screen example of binder creation rules regarding the permitted document.

Referring to FIG. 8, the settings regarding the permitted document type will be described below. If a permitted document tab 801 is designated in the dialog as described in connection with FIG. 7, a screen of FIG. 8 appears, whereby the document type of the original document permitted to be bound into the binder document can be designated. An input area 802 is the area for inputting the document type of the original document bound into the binder document. If an addition button 803 is depressed after the document type of the original document is inputted into the input area 802, the document type inputted into the input area 802 is added to a permitted document type display area 805. Conversely, when the document type designated in the permitted document type display area 805 is deleted, the document type to be deleted in the permitted document type display area 805 is selected, and a deletion button 804 is depressed.

The document type of the original document permitted to be bound into the binder is displayed in the permitted document type display area 805. All the document types can be bound into the binder document by checking a full document selection check box 806.

A binder document type name is inputted into an input area 807. In an example of FIG. 8, for the binder document type of "contract document", the original documents in which the document type is "front cover", "estimate", "contract" and "minute" are permitted to be bound into the binder document. If all the settings are ended, an OK button 808 is depressed, so that the setup information is recorded in the system. Thus, the information corresponding to the permitted document type tag 609 regarding the binder type is set up. If the same binder document type as the type inputted in an input area 807 is already set up in the system, a warning dialog is displayed in the same manner as in FIG. 7 to prompt the user to make specification. The setting can be canceled by depressing a cancel button 809.

(3) Setting the Prohibited Document Type

Figure 9:
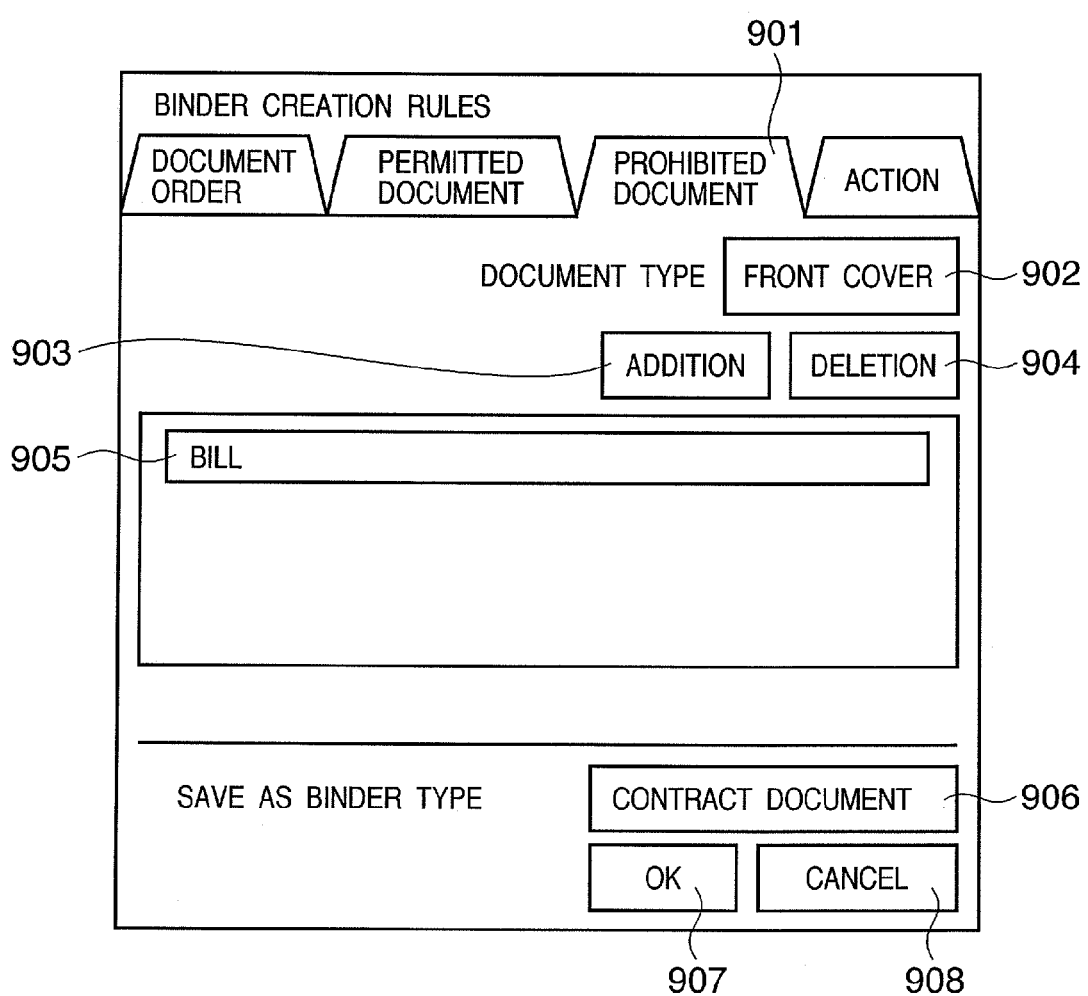
FIG. 9 is a view showing a setting screen example of binder creation rules regarding the prohibited document.

Referring to FIG. 9, the settings for the prohibited document type will be described below. If a prohibited document tab 901 is designated in the dialog as described in connection with FIG. 7, a screen of FIG. 9 appears, whereby the document type of the original document not permitted to be bound into the binder document can be designated. An input area 902 is the area for inputting the document type of the original document prohibited from being bound into the binder document. If an addition button 903 is depressed after the document type of the original document is inputted into the input area 902, the document type inputted into the input area 902 is added to a prohibited document type display area 905. Conversely, when the document type designated in the prohibited document type display area 905 is deleted, the document type to be deleted within the prohibited document type display area 905 is selected, and then a deletion button 904 is depressed.

A binder document type name is inputted into an input area 906. In an example of FIG. 9, for the binder document type of "contract document", the original document in which the document type is "bill" is prohibited from being bound into the binder document. If all the settings are ended, an OK button 907 is depressed, so that the setup information is recorded in the system. Thus, the information corresponding to the prohibited document type tag 610 regarding the binder type is set up. If the same binder document type as the type inputted in the input area 906 is already set up in the system, a warning dialog is displayed in the same manner as in FIG. 7 to prompt the user to make specification. The setting can be canceled by depressing a cancel button 908.

When the original document other than the permitted document type and the prohibited document type is designated as the original document to be bound into the binder, a warning dialog is displayed in creating the binder document to prompt the user to judge whether or not the original document is bound into the binder document. For one binder document type, the same document type can not be designated for both the permitted document and the prohibited document. For example, if the document type is set up previously as the permitted document in a certain binder type and the document type is thereafter set up as the prohibited document, and the OK button 907 is depressed to save it as the binder type with the same name, a warning dialog is displayed to prompt the user to reset.

(4) Setting the Action

Figure 10:
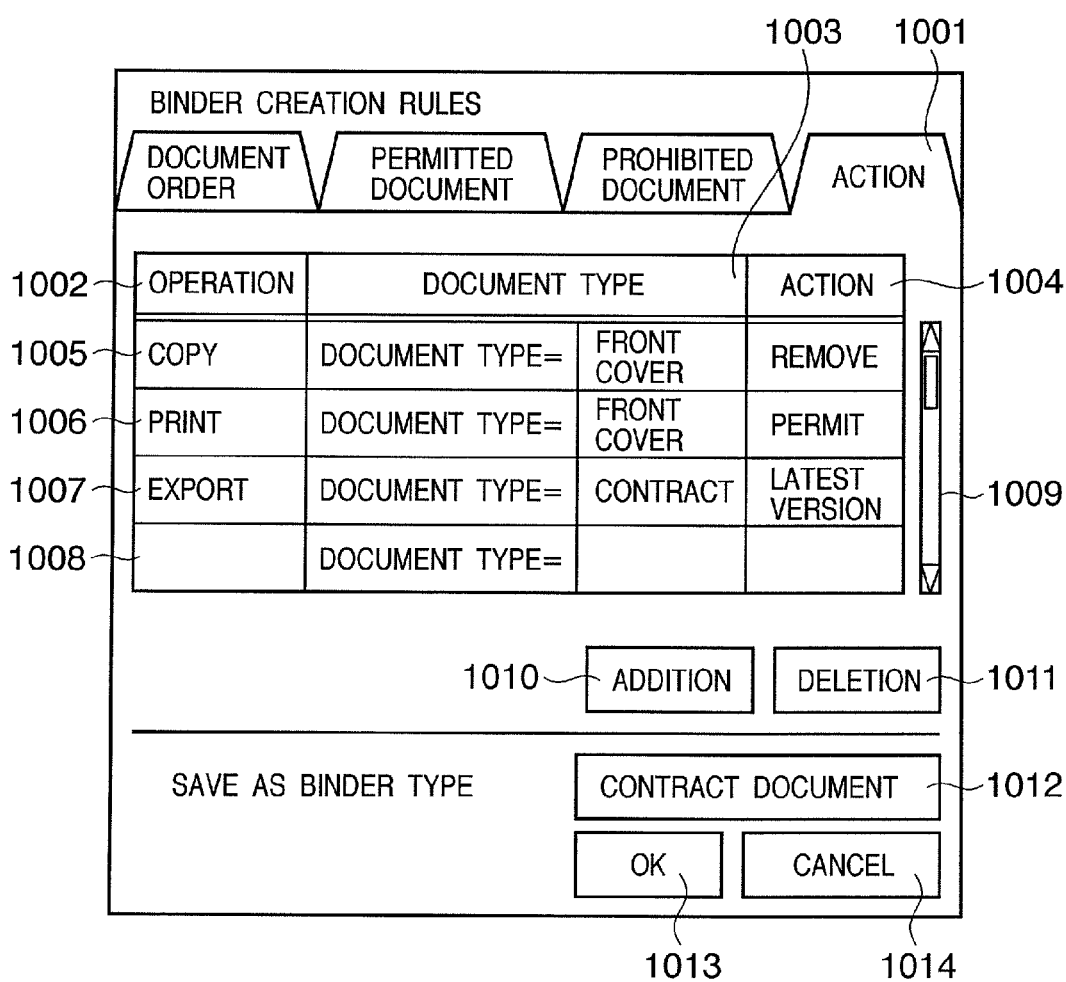
FIG. 10 is a view showing a setting screen example of binder creation rules regarding the action.

Referring to FIG. 10, a method for setting the action (action tag 611) as described in FIG. 6B will be described below. If an action tab 1001 is designated in the dialog as described in connection with FIG. 7, a screen of FIG. 10 appears. What action is performed according to the document type of the original document when an operation such as copying, printing or exporting the created binder document is performed, can be set up using the dialog of FIG. 10.

In this embodiment, the setting is made by inputting the necessary information in a table. An operation for action is inputted into the column of an operation heading 1002. For example, the "copy", "print" and "export" of the binder document are provided. The character string is directly inputted, or a menu is opened separately to select a desired operation. In the column of a document type heading 1003, the document types of "front cover", "estimate" and "contract", for example, are inputted. The character string is directly inputted, or a menu is opened separately to select a desired operation, like the column of the operation heading 1002. In the column of an action heading 1004, what process is performed is set up, if the conditions set for the columns of the operation heading 1002 and the document type heading 1003 are satisfied. A scroll bar 1009 can scroll the display, if the setting items are not contained within the display area. At the scroll time, the headings 1002 to 1004 are fixed, and a setting display area below them is scrolled.

In FIG. 10, three actions are set up. A row 1005 has such a setting that when the copy operation is performed for the binder document, the original document in which the document type is front cover is removed, namely, not included in the binder document to be copied. This setting is defined as "Act=Remove" as indicated at 612 in FIG. 6B. A row 1006 has such a setting that when the print operation is performed, the original document in which the document type is front cover is permitted to be printed. That is, only the original document in which the document type is front cover is printed, and the document of any other document type such as estimate or contract is not copied as the paper document. A row 1007 has such a setting that when the export operation is performed, the original document in which the document type is contract is updated by rebinding the latest original document into the binder, and then the binder is exported. The explanation thereof has been made previously using FIG. 6B. A row 1008 is the blank line. When the action is added, an addition button 1010 is depressed and the set value is inputted into each cell in the row 1008. Conversely, when the action is deleted, the row (action) to be deleted from the table is selected (clicked), and a deletion button 1011 is depressed. The row of the selected (clicked) action is reversely displayed.

A binder document type name is inputted into an area 1012. In an example of FIG. 10, the actions as set in the rows 1005 to 1007 are set up in the binder document type of "contract document". If all the settings are ended, an OK button 1013 is depressed, so that the setting information is recorded in the system. Thus, the information corresponding to the action tag 611 for the binder type is set up. If the same binder document type as the type inputted in the area 1012 is already set up in the system, a warning dialog is displayed to prompt the user to designate in the same manner as in FIG. 7. The setting can be canceled by depressing a cancel button 1014.

The binder creation rules as described above using FIGS. 7, 8, 9 and 10 are referred to within the system when creating the binder document and employed as the attribute information of the binder document as described in connection with FIG. 6B. The created binder creation rules for each binder type are saved on the internal data storage unit 107.

[Creation Process for Binder Document with Document Management System]

Referring to a flowchart of FIG. 11, a creation process for the binder document with the document management system will be described below. In this embodiment, the following process is performed by the document management control unit 106.

Figure 11:
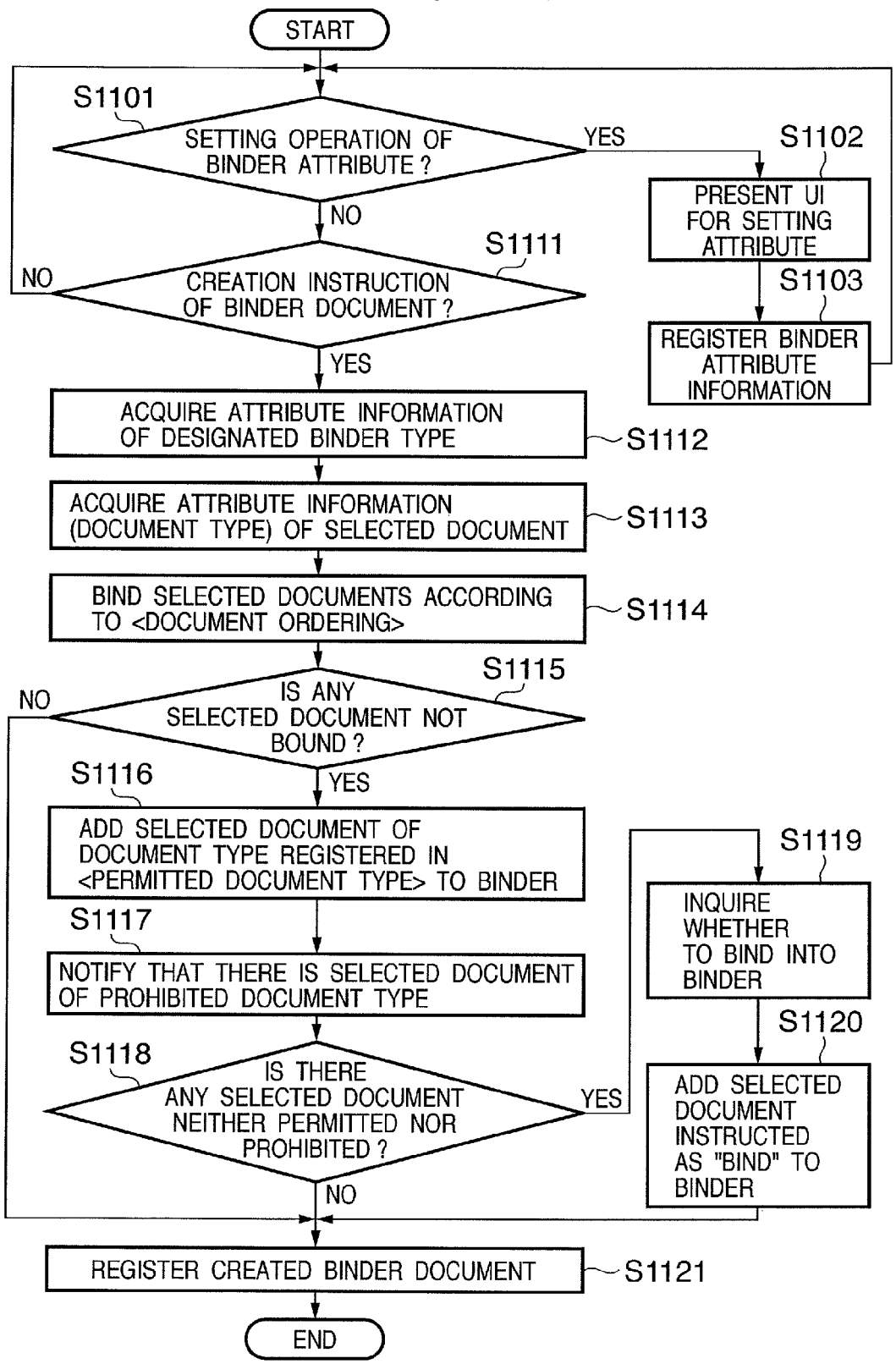
FIG. 11 is a flowchart for explaining a binder document creation process according to this embodiment.

In FIG. 11, steps S1101 to S1103 show a setting process for the binder attribute. If a setting operation for the binder attribute is started (a binder creation rule menu is specified), the procedure goes from step S1101 to step S1102, where the user interface as shown in FIGS. 7 to 10 is presented according to an operation of the user. If an instruction for settling the set content is entered by depressing the OK button 709, the binder attribute information is registered in the attribute database 138 at step S1103.

On the other hand, if a new binder menu 308 of FIG. 3 is instructed, and the OK button 404 in the new binder creation dialog 400 of FIG. 4 is instructed, it is judged that the creation of the binder document is instructed. If the creation of the binder document is instructed, the procedure goes from step S1111 to step S1112. At step S1112, the document management control unit 106 acquires the binder type attribute information (information corresponding to the tags 607 to 611 of FIG. 6B) specified in the area 403 of the new binder creation dialog 400 of FIG. 4 from the internal data storage unit 107. At step S1113, the document type is acquired from each attribute information of the original document selected in the document display area 303 to be bound into the binder document. For example, three original documents are selected in the example of FIG. 3, and the "front cover", "contract" and "estimate" are acquired as the document type.

At step S1114, the selected original documents are ordered and bound according to the document ordering (608 in FIG. 6B) for the attribute information acquired at step S1112 and each document type acquired at step S1113. If all the selected original documents are bound at step S1114, the procedure goes from step S1115 to step S1121. If the original document not bound at step S1114 exists, the procedure goes to step S1116, or if the original document corresponding to the permitted document type (609 in FIG. 6B) exists, it is additionally bound into the binder document. The bind position is next to the group of original documents in the specified order, thereby binding the original documents successively (the order of original documents additionally bound is arbitrary at this time). Also, it is notified that the original document corresponding to the prohibited document type (610 in FIG. 6B), if any, at step S1117.

If the original document belonging to neither the permitted document type nor the prohibited document type does not exist, the procedure goes from step S1118 to step S1121. On the other hand, if the original document belonging to neither the permitted document type nor the prohibited document type exists, the procedure goes from step S1118 to step S1119 to inquire of the user whether or not the original document is bound into the binder document. If a plurality of such original documents exist, whether or not the original documents are bound can be specified individually. At step S1120, the original document specified as binding at step S1119 is bound into the binder document. At step S1121, the created binder document is registered in the volume database and this process is ended.

[Operation of Binder Document with Document Management System]

Figure 12:
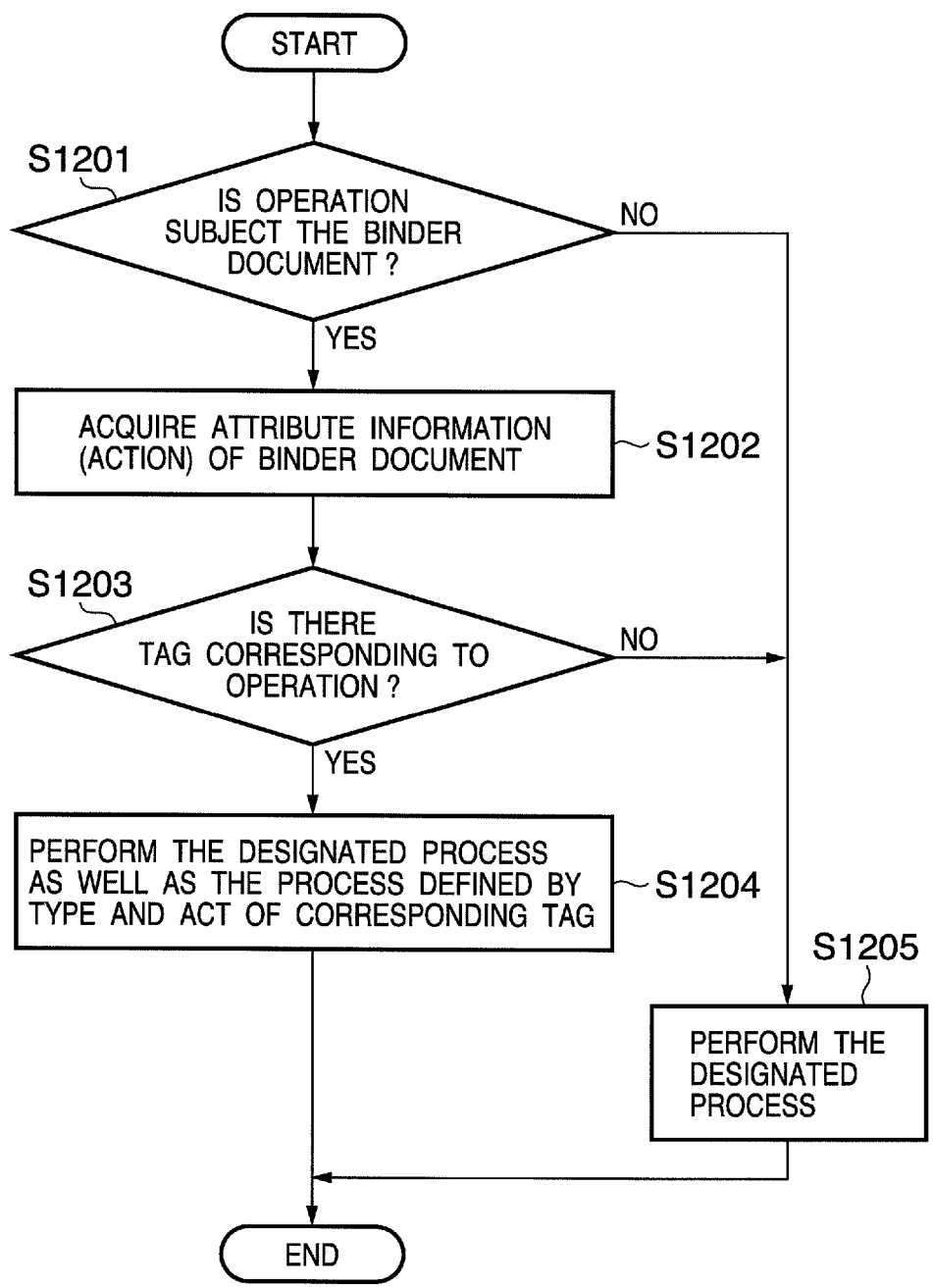
FIG. 12 is a flowchart for explaining a binder document operation process according to this embodiment.

Referring to FIG. 12, a process where a copy or print operation is performed for the binder document created and registered in the above way will be described below.

At step S1201, the document management control unit 106 determines whether or not the operation subject is the binder document. If the operation subject is not the binder document, the procedure goes to step S1205 to perform the normal process corresponding to the specified operation. On the other hand, if the operation subject is the binder document, the procedure goes to step S1202, where the document management control unit 106 acquires the action (611 in FIG. 6B) included in the attribute information for the binder document of the operation subject. At step S1203, it is determined whether or not the tag corresponding to the specified operation exists. For example, if the copy operation is specified, the tag 612 of FIG. 6B is the tag corresponding to the specified operation. If the tag corresponding to the specified operation does not exist, the procedure goes to step S1205, where the document management control unit 106 performs the specified operation for the binder document.

If the tag corresponding to the specified operation exists, the procedure goes to step S1204, where the document management control unit 106 performs the process designated by Act for the original document of the document type specified by Type of the corresponding tag as well as the specified operation. For example, in the case of the tag 612, the original document in which the document type is contract is excluded from the copy subject at the time of the copy operation. Also, in the case of the tag 613, only the original document in which the document type is front cover is printed at the time of the print operation. Also, in the case of the tag 614, the original document in which the document type is contract is updated to the latest contents at the time of the export operation.

In FIG. 6B, only one tag is designated for each operation, but a plurality of tags may be set up for each operation. For example, the tag 613 is described for the front cover and the estimate, only the front cover and the estimate are give a print permission.

As described above, with this embodiment, when a plurality of original documents are bound to create the binder document or add the original document to the binder document, it is unnecessary for the user to specify the ordering of the original documents every time. Therefore, the operation procedure of the user is simplified, and the confusion due to a false operation can be avoided.

Also, apart from setting the access right dependent on the system to be operated, the restrictions in the copy or print operation for the binder document can be imposed on each original document making up the binder document. Therefore, the security measures for the confidential document can be taken, or the cost reduction can be made to suppress the increased paper documents due to the useless printing.

Moreover, when the original document is edited or updated, it is unnecessary for the user to confirm the update situation of the original documents individually, whereby the document can be treated efficiently by reflecting the latest information at any time without taking the troubles of the user.

Though this embodiment has been described above, the invention may take the embodiments as a system, an apparatus, a method, a program or a recording medium. Specifically, the invention may be applied to the system consisting of a plurality of apparatuses, or an apparatus consisting of one unit.

The invention may also encompass a case of supplying a software program to the system or the apparatus directly or from the remote site, and reading and executing the supplied program code on a computer of the system or apparatus to achieve the functions of the above-described embodiment. In this case, the supplied program is the program corresponding to the flowchart as shown in the drawing with the embodiment.

Accordingly, the program code itself installed in the computer to implement the functional process of the invention on the computer may also implement the invention. That is, the invention also encompasses the computer program itself to implement the functional process of the invention.

In this case, the program may take the form of an object code, a program executed by the interpreter, or the script data supplied to the OS as far as it has the functions of the program.

The recording media for supplying the program include the following. For example, a floppy (registered trademark) disk, a hard disk, an optical disk, an optical magnetic disk, MO, CD-ROM, CD-R, CD-RW, a magnetic tape, a non-volatile memory card, ROM, and DVD (DVD-ROM, DVD-R).

In addition, a supply method for the program involves connecting to a home page of the Internet using a browser of the client computer, and downloading the computer program of the invention from the home page into a recording medium such as hard disk. In this case, the program to be downloaded may be a compressed file having an automatic install function. Also, the program code composing the program of the invention may be divided into a plurality of files, each file being downloaded from a different home page. That is, a WWW server for downloading the program file for implementing the function process of the invention on the computer to a plurality of users is also included in the invention.

Also, the program of the invention may be encrypted, and stored in a storage medium such as CD-ROM to be delivered to the user. In this case, the user clearing the predetermined conditions downloads the key information for decrypting from a home page via the Internet, and can install the program in a computer by decrypting the encrypted program using the key information.

Also, the computer executes the read program to implement the functions of the previously-described embodiment, and to implement the functions of the embodiment in cooperation with the OS operating on the computer in accordance with the instructions of the program. In this case, the OS performs a part or all of the actual process to implement the functions of the previously described embodiment.

Moreover, the program read from the recording medium is written into a memory for a function extension board inserted into the computer, or a function extension unit connected to the computer to implement a part or all of the embodiment. In this case, after the program is written into the function extension board or the function extension unit, the CPU for the function extension board or the function extension unit performs a part or all of the actual process in accordance with the instructions of the program.

In the above way, with the invention, the operability in generating or using the binder document is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-302161, filed Oct. 17, 2005, which is hereby incorporated by reference herein in its entirety.

What is claimed is:

1. A document processing method executable by a microprocessor for generating a binder document by binding a plurality of original documents, the method comprising:
 a document selection step of selecting, based on a user first selection, the plurality of original documents to be bound;
 a binder type selection step of selecting, based on a user second selection, a desired binder type of the binder document from among a plurality of binder types stored in advance in a storage unit, wherein each of the stored binder types is set with binder attribute information, which includes type information indicating document types of a document to be bound in the binder document and ordering information indicating an order of the document types indicated by the type information in the binder document,
 a first acquisition step of acquiring, from the storage unit, the binder attribute information set to the selected binder type;
 a second acquisition step of acquiring the document types corresponding to the selected plurality of original documents; and
 a generation step of generating the binder document by extracting the selected original documents having the document type indicated by the type information of the acquired binder attribute information and binding the extracted original documents in the order of document types in the binder document indicated by the ordering information of the acquired binder attribute information.

2. The document processing method according to claim 1, wherein:
 the binder attribute information further includes permitting information indicating the document type permitted to be bound in the binder document, and
 the generation step comprises generating the binder document by further binding the original document of the document type that is not defined by the type information but indicated by the permitting information, into the binder document after the extracted original documents are bound in the binder document in accordance with the ordering information.

3. The document processing method according to claim 1, wherein:
 the binder attribute information includes prohibition information indicating the document type not permitted to be bound in the binder document, and
 the generation step comprises generating the binder document by excluding the original document of the document type indicated by the prohibition information among the selected plurality of original documents.

4. The document processing method according to claim 1, wherein:
 the binder attribute information includes permitting information indicating the document type permitted to be bound in the binder document and prohibition information indicating the document type not permitted to be bound in the binder document, and
 when the original document of the document type not indicated in either the permitting information or the prohibition information exists among the selected plurality of original documents, the generation step comprises making an inquiry to the user as to whether or not to bind in the binder document the original document of the document type that is not indicated in either the permitting information or the prohibition information, and generates the binder document based on an instruction of the user being inquired.

5. The document processing method according to claim 1, further comprising:
an execution step of executing a designated operation for the generated binder document,
wherein the binder attribute information further includes copy prohibition information designating a document type to be excluded from processing subjects of copy operation, and
wherein, if the designated operation is the copy operation, the execution step comprises prohibiting the copy of the original document of the document type designated by the copy prohibition information among the original documents included in the binder document.

6. The document processing method according to claim 1, further comprising:
an execution step of executing a designated operation for the generated binder document,
wherein the binder attribute information further includes print permitting information designating the document type permitted to be printed at the time of print operation, and
wherein if the designated operation is the print operation, the execution step comprises permitting the print for only the original document of the document type designated by the print permitting information among the original documents included in the binder document.

7. The document processing method according to claim 1, further comprising:
an execution step of executing a designated operation for the generated binder document,
wherein the binder attribute information includes update information designating the document type to update the original document at the time of export operation, and
wherein if the designated operation is the export operation, the execution step comprises updating the original document of the document type designated by the update information among the original documents included in the binder document with the latest contents of the corresponding original document.

8. A document processing apparatus for generating a binder document by binding a plurality of original documents, the document processing apparatus comprising:
a microprocessor coupled to a memory;
a storage unit adapted to store a plurality of binder types in advance, wherein each of the stored binder types is set with binder attribute information, which includes type information indicating document types of a document to be bound in the binder document and ordering information indicating an order of the document types indicated by the type information in the binder document,
wherein the microprocessor is programmed to provide:
a document selection task that selects, based on a user first selection, the plurality of original documents to be bound;
a binder type selection task that selects, based on a user second selection, a desired binder type of the binder document from among the plurality of stored binder types;
a first acquisition task that acquires, from the storage unit, the binder attribute information set to the selected binder type;
a second acquisition task that acquires document types corresponding to the selected plurality of original documents; and
a generation task that generates the binder document by extracting the selected original documents having the document type indicated by the type information of the acquired binder attribute information and binding the extracted original documents in the order of document types in the binder document indicated by the ordering information of the acquired binder attribute information.

9. The document processing apparatus according to claim 8, wherein:
the binder attribute information further includes permitting information indicating the document type permitted to be bound in the binder document, and
the generation task generates the binder document by further binding the original document of the document type that is not defined by the type information but indicated by the permitting information, into the binder document after the extracted original documents are bound in the binder document in accordance with the ordering information.

10. The document processing apparatus according to claim 8, wherein:
the binder attribute information includes prohibition information indicating the document type not permitted to be bound in the binder document, and
the generation task generates the binder document by excluding the original document of the document type indicated by the prohibition information among the selected plurality of original documents.

11. The document processing apparatus according to claim 8, wherein:
the binder attribute information includes permitting information indicating the document type permitted to be bound in the binder document and prohibition information indicating the document type not permitted to be bound in the binder document, and
when the original document of the document type not indicated in either the permitting information or the prohibition information exists among the selected plurality of original documents, the generation task makes an inquiry to the user as to whether or not to bind in the binder document the original document that is not indicated in either the permitting information or the prohibition information, and generates the binder document based on an instruction of the user associated with the inquiry.

12. The document processing apparatus according to claim 8, wherein:
the microprocessor is further programmed to provide an execution task that executes a designated operation for the generated binder document,
the binder attribute information further includes copy prohibition information designating a document type to be excluded from processing subjects of copy operation, and
if the designated operation is the copy operation, the execution task prohibits the copy of the original document of the document type designated by the copy prohibition information among the original documents included in the binder document.

13. The document processing apparatus according to claim 8, wherein:
the microprocessor is further programmed to provide an execution task that executes a designated operation for the generated binder document,
the binder attribute information further includes print permitting information designating a document type permitted to be printed at the time of print operation, and if the designated operation is the print operation, the execution task permits the print for only the original document of the document type designated by the print permitting information among the original documents included in the binder document.

14. The document processing apparatus according to claim 8, wherein:

the microprocessor is further programmed to provide an execution task that executes a designated operation for the generated binder document, the binder attribute information includes update information designating a document type to update the original document at the time of export operation, and if the designated operation is the export operation, the execution task updates the original document of the document type designated by the update information among the original documents included in the binder document with the latest contents of the corresponding original document.

15. A non-transitory computer-readable storage medium storing a control program for performing a document processing method of generating a binder document by binding a plurality of original documents on a computer, the document processing method comprising:

a document selection step of selecting, based on a user first selection, the plurality of original documents to be bound;

a binder type selection step of selecting, based on a user second selection, a desired binder type of the binder document from among a plurality of binder types stored in advance in a storage unit, wherein each of the stored binder types is set with binder attribute information, which includes type information indicating document types of a document to be bound in the binder document and ordering information indicating an order of the document types indicated by the type information in the binder document, a first acquisition step of acquiring, from the storage unit, the binder attribute information set to the selected binder type;

a second acquisition step of acquiring the document types corresponding to the selected plurality of original documents; and a generation step of generating the binder document by extracting the selected original documents having the document type indicated by the type information of the acquired binder attribute information and binding the extracted original documents in the order of document types in the binder document indicated by the ordering information of the acquired binder attribute information.

* * * * *